US012602120B2

(12) United States Patent
Kamiyama

(10) Patent No.: US 12,602,120 B2
(45) Date of Patent: *Apr. 14, 2026

(54) ELECTRONIC PEN HAVING KNOCK MECHANISM TO PUSH AND RETRACT ELECTRONIC PEN MAIN BODY OUT OF AND INTO PEN HOUSING

(71) Applicant: Wacom Co., Ltd., Saitama (JP)

(72) Inventor: Ryoji Kamiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/926,045

(22) Filed: Oct. 24, 2024

(65) Prior Publication Data

US 2025/0053251 A1      Feb. 13, 2025

Related U.S. Application Data

(63) Continuation of application No. 18/344,585, filed on Jun. 29, 2023, now Pat. No. 12,153,744.

(30) Foreign Application Priority Data

Jul. 25, 2022    (JP) ................................. 2022-117723
Sep. 14, 2022    (JP) ................................. 2022-146186

(51) Int. Cl.
*G06F 3/0354*          (2013.01)
*G06F 3/041*           (2006.01)
*G06F 3/046*           (2006.01)

(52) U.S. Cl.
CPC ........ *G06F 3/03545* (2013.01); *G06F 3/0414* (2013.01); *G06F 3/046* (2013.01); *G06F 2203/04105* (2013.01)

(58) Field of Classification Search
CPC ..... G06F 3/03545; G06F 3/0414; G06F 3/046
See application file for complete search history.

(56) References Cited

U.S. PATENT DOCUMENTS 8,913,041 B2    12/2014  Fukushima et al.
9,063,025 B2     6/2015  Horie et al.
(Continued)

FOREIGN PATENT DOCUMENTS

JP          2011186803 A      9/2011
JP          2013161307 A      8/2013
(Continued)

*Primary Examiner* — Liliana Cerullo
(74) *Attorney, Agent, or Firm* — Seed Intellectual Property Law Group LLP

(57) ABSTRACT

An electronic pen includes a cylindrical pen housing having an opening on a pen tip side and having a hollow portion inside, and an electronic pen main body having a cylindrical main body housing to be housed in the hollow portion of the pen housing. An axial member is installed on one end side of the main body housing, while another end side of the main body housing is locked in the pen housing. A projection portion projecting in a direction crossing the axial direction is formed on an outer circumference portion of the main body housing at a predetermined position in the axial direction. A stopper portion to be engaged with the projection portion in a state in which a tip end side of the axial member is exposed outside from the opening is formed on an inner wall surface of the hollow portion of the pen housing.

18 Claims, 6 Drawing Sheets

(56)     References Cited

U.S. PATENT DOCUMENTS

| | | | |
|---|---|---|---|
| 12,153,744 B2 * | 11/2024 | Kamiyama | ........... G06F 3/0414 |
| 2018/0299977 A1 | 10/2018 | Ogata et al. | |
| 2021/0382569 A1 | 12/2021 | Kamiyama | |

FOREIGN PATENT DOCUMENTS

| | | |
|---|---|---|
| WO | WO 2016158418 A1 | 10/2016 |
| WO | WO 2020183772 A1 | 9/2020 |

* cited by examiner

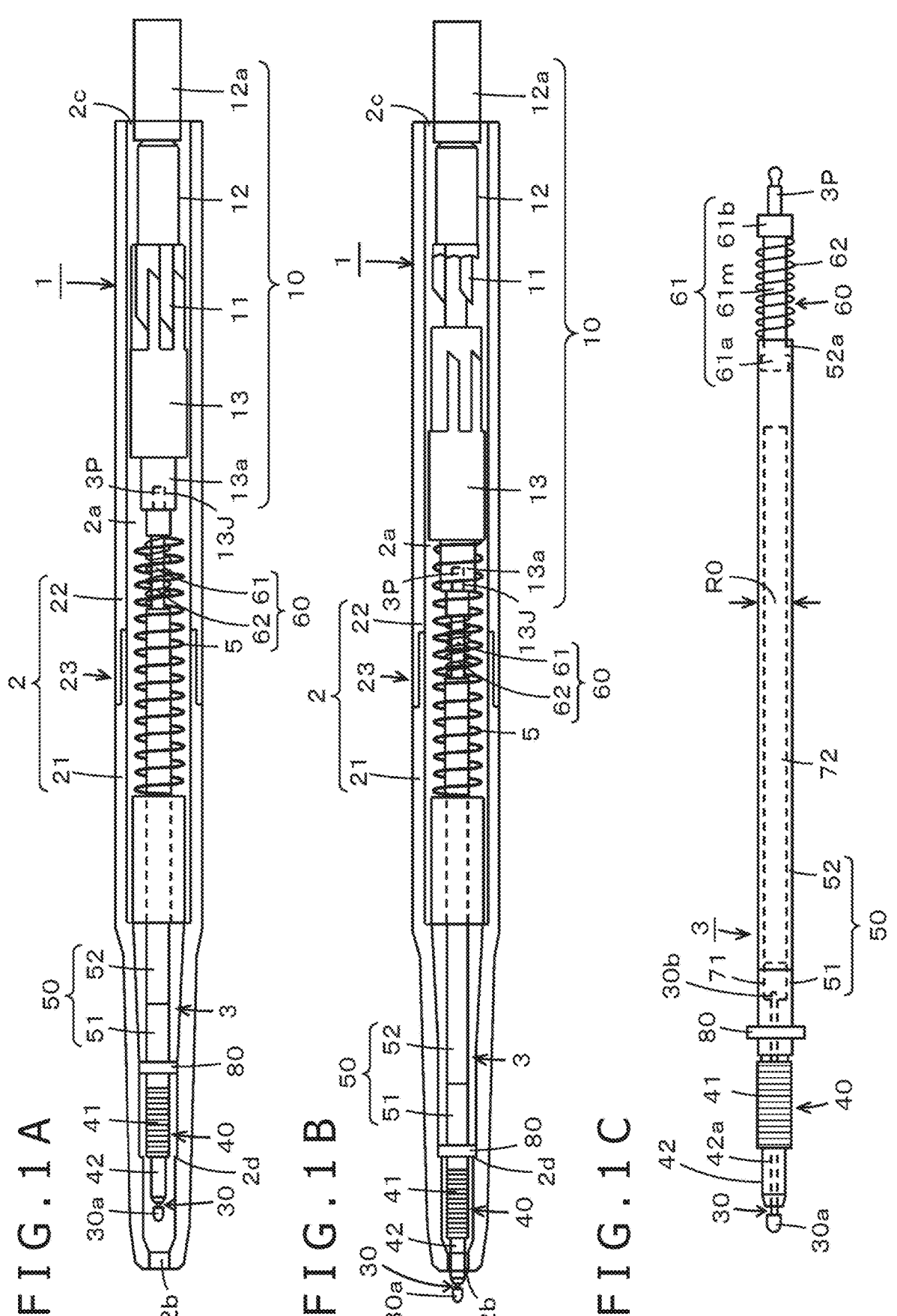
F I G . 1 A
F I G . 1 B
F I G . 1 C

FIG.2
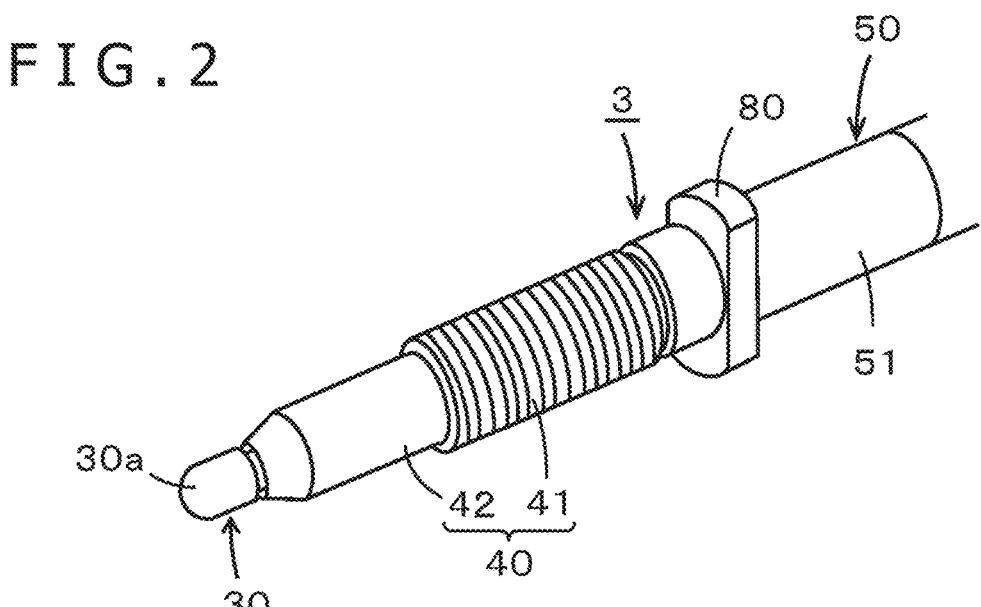
FIG.3A
FIG.3B
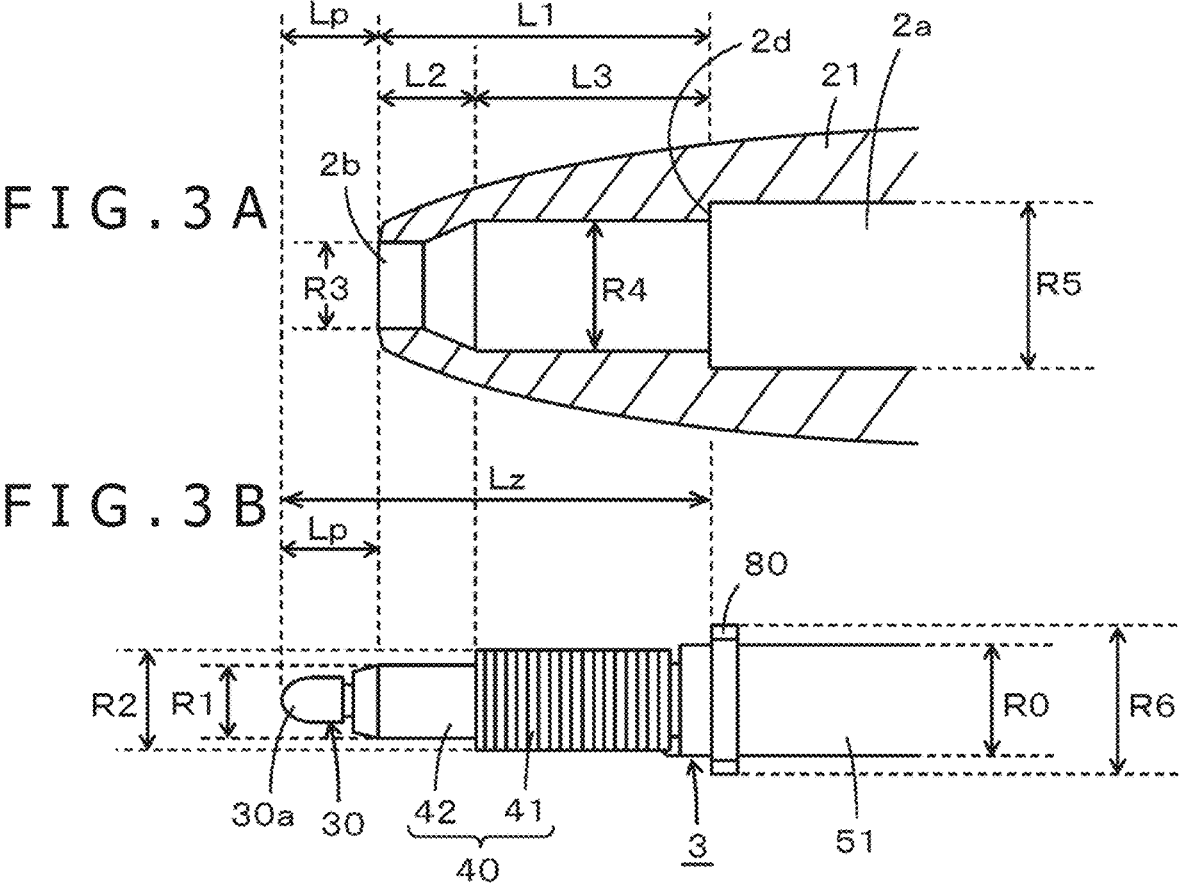

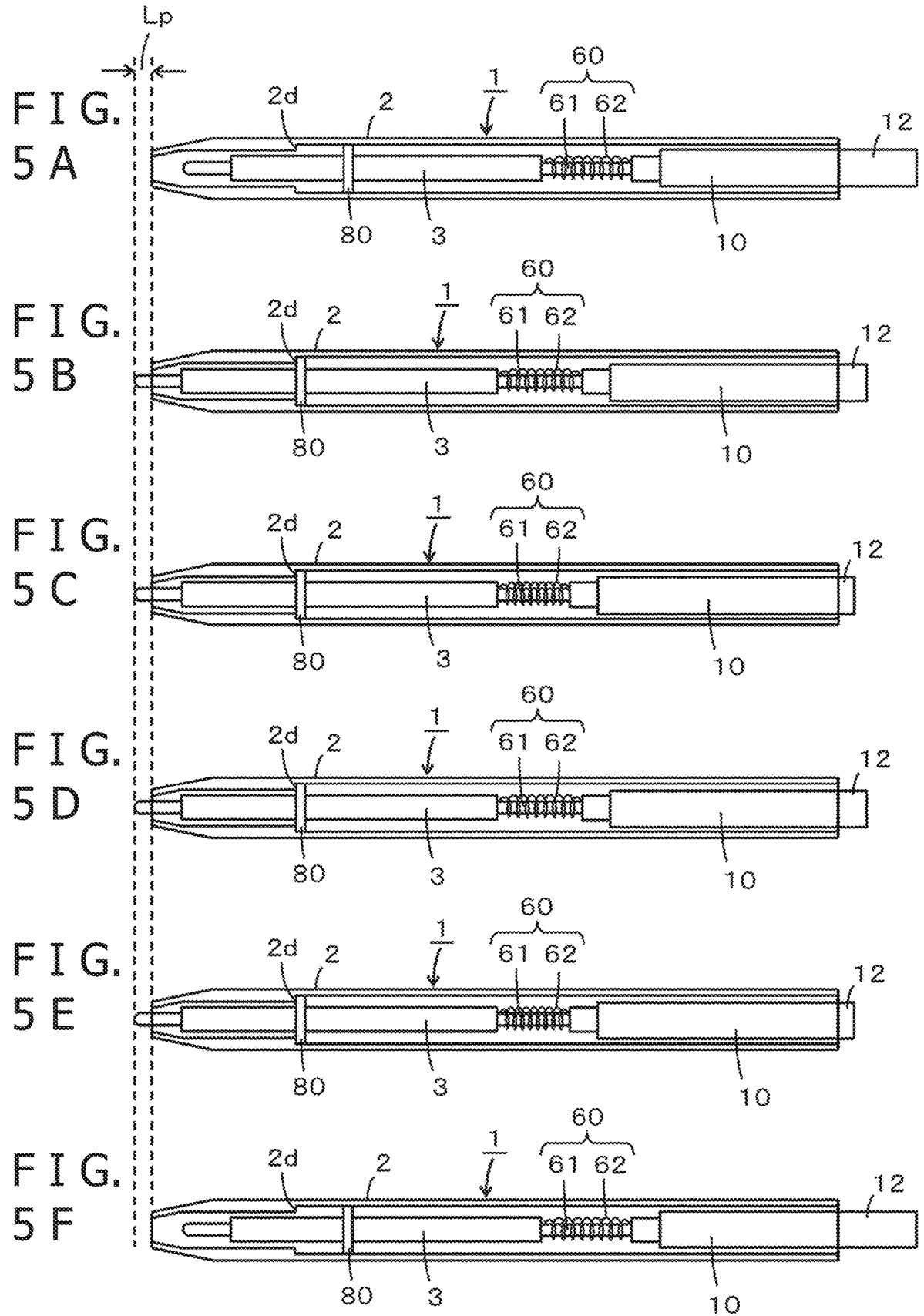

F I G . 7 A
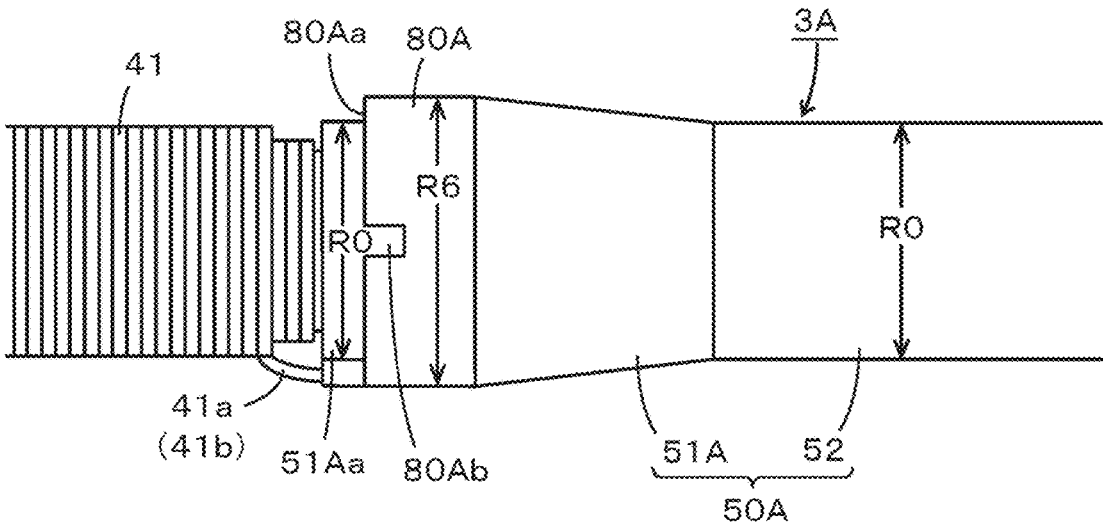
F I G . 7 B
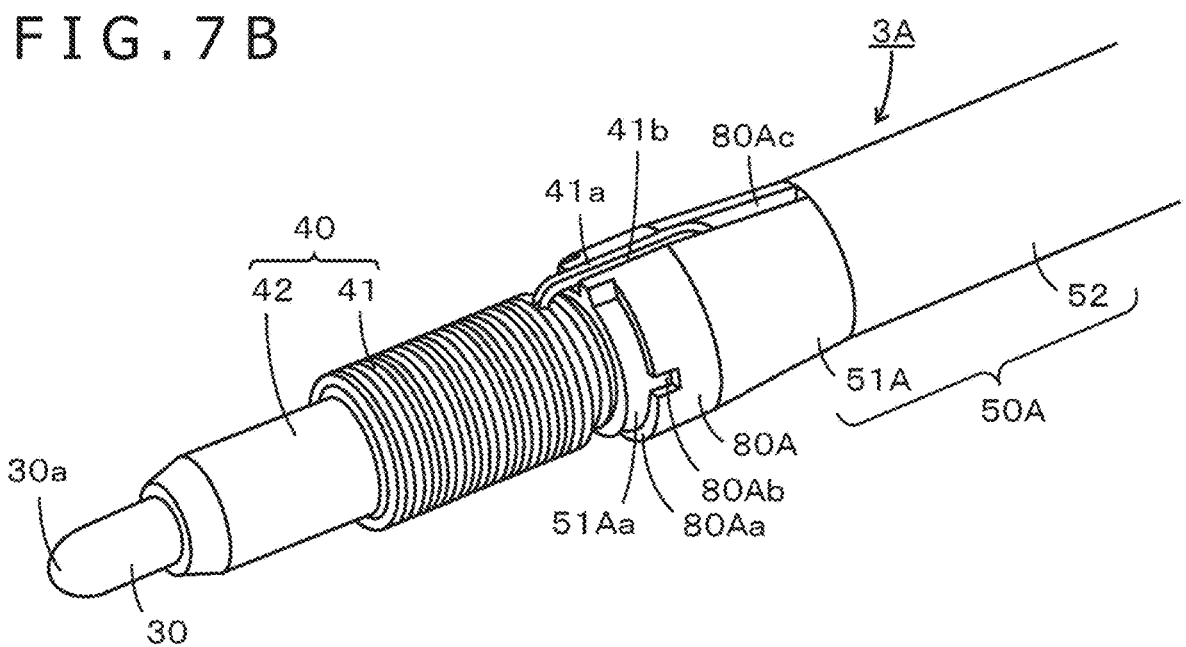

ELECTRONIC PEN HAVING KNOCK MECHANISM TO PUSH AND RETRACT ELECTRONIC PEN MAIN BODY OUT OF AND INTO PEN HOUSING

BACKGROUND

Technical Field

The present disclosure relates to an electronic pen including an electronic pen main body housed in a pen housing, and relates to the electronic pen main body.

Description of the Related Art

In recent years, what is generally called a cartridge-type electronic pen is becoming more popular due to diversification (with emphasis on design) of the overall shapes (outer housing). To realize this, an electronic pen is proposed in which an electronic pen main body having main functions of the electronic pen, such as a position indication function for a position detection sensor and a pen pressure detection function, is housed as an electronic pen cartridge in a pen housing (see, for example, WO 2016/158418).

This type of electronic pen can be formed by merely housing and incorporating the electronic pen main body into a hollow portion of the cylindrical pen housing. The electronic pen main body can easily be replaced just like a refill of a ballpoint pen, and the electronic pen can have a knock-type configuration, which is very convenient.

In the electronic pen described above, a back end side of the electronic pen main body on a side opposite to a pen tip side in an axial direction of the electronic pen main body is fitted to a fitting portion provided in the pen housing, and the electronic pen main body is thus held in the pen housing. Therefore, the pen tip side of the electronic pen main body can freely move, and a component that should not come into contact with an inner wall surface of the pen housing on the pen tip side of the electronic pen main body may come into contact with the inner wall surface of the pen housing.

Meanwhile, an axial member is installed on the pen tip side of the electronic pen main body, and a tip end portion of the installed axial member protrudes from an opening defined on the pen tip side of the pen housing during the use of the electronic pen. Depending on the fitting amount of the back end portion of the electronic pen main body with respect to the fitting portion in the pen housing, the length of the part of the electronic pen main body provided with the axial member which protrudes from the opening on the pen tip side of the pen housing may vary. The length variations also may cause a component that should not come into contact with the inner wall surface of the pen housing on the pen tip side of the electronic pen main body to come into contact with the inner wall surface of the pen housing.

In addition, in the case of the knock-type electronic pen, when a knock operation is performed to push out the pen tip or to pull back the pen tip into the pen housing, the pen tip side of the electronic pen main body temporarily protrudes from the opening on the pen tip side of the pen housing more than the amount of the pen tip protruding from the opening on the pen tip side of the pen housing during the use of the electronic pen, due to the configuration of a conventional knock cam mechanism using a rotating cam. During the knock operation, a component that should not come into contact with the inner wall surface of the pen housing on the pen tip side of the electronic pen main body may come into contact with the inner wall surface of the pen housing.

Examples of a component that should not come into contact with the inner wall surface of the pen housing on the pen tip side of the electronic pen main body include a coil wound around a magnetic core in an electronic pen of an electromagnetic induction type. That is, the coil wound around the magnetic core is arranged near the pen tip side in the case of the electronic pen of the electromagnetic induction type, and if the coil comes into contact with the inner wall surface of the pen housing, a load is applied to the coil at the contact point. A magnetic flux for coupling with the position detection sensor through electromagnetic induction becomes unstable, and this may adversely affect interaction characteristics between the electronic pen and the position detection sensor.

BRIEF SUMMARY

One aspect of the present disclosure is to provide an electronic pen that can solve the problems described above.

To solve the problems described above, provided is an electronic pen including a cylindrical pen housing having an opening on a pen tip side and having a hollow portion inside, and an electronic pen main body having a cylindrical main body housing to be housed in the hollow portion of the pen housing, with an axial member installed on one end side in an axial direction of the main body housing, and another end side in the axial direction of the main body housing being locked in the pen housing. A projection portion projecting in a direction crossing the axial direction of the main body housing is formed on an outer circumference portion of the main body housing of the electronic pen main body, at a predetermined position in the axial direction. A stopper portion to be engaged with the projection portion of the main body housing in a state in which a tip end side of the axial member is exposed outside from the opening of the pen housing, to prevent the electronic pen main body from moving toward the pen tip side in the pen housing, is formed on an inner wall surface of the hollow portion of the pen housing.

In the electronic pen with the configuration described above, the projection portion provided on the outer circumference portion of the main body housing of the electronic pen main body is engaged with the stopper portion provided on the inner wall surface of the pen housing, and this prevents the electronic pen main body from moving toward the pen tip side. Therefore, the electronic pen with the configuration described above may prevent a component that should not come into contact with the inner wall surface of the pen housing on the pen tip side of the electronic pen main body from coming into contact with the inner wall surface on the pen tip side of the pen housing of the electronic pen.

BRIEF DESCRIPTION OF THE SEVERAL VIEWS OF THE DRAWINGS

FIGS. 1A to 1C are diagrams for explaining an electronic pen and a an electronic pen main body according to an embodiment of the present disclosure;

FIG. 2 is a diagram for explaining a configuration example of a pen tip side in the electronic pen and the electronic pen main body according to the embodiment;

FIGS. 3A and 3B are diagrams for explaining a configuration example of the pen tip side in the electronic pen main body according to the embodiment;

FIGS. 5A to 5F are diagrams for explaining movement of the pen tip side during a knock operation in the electronic pen according to the embodiment of the present disclosure;

FIGS. 7A and 7B are diagrams for explaining an electronic pen main body according to another embodiment of the present disclosure.

DETAILED DESCRIPTION

Figures 4A, 4B, 4C, 4D, 4E, 4F:
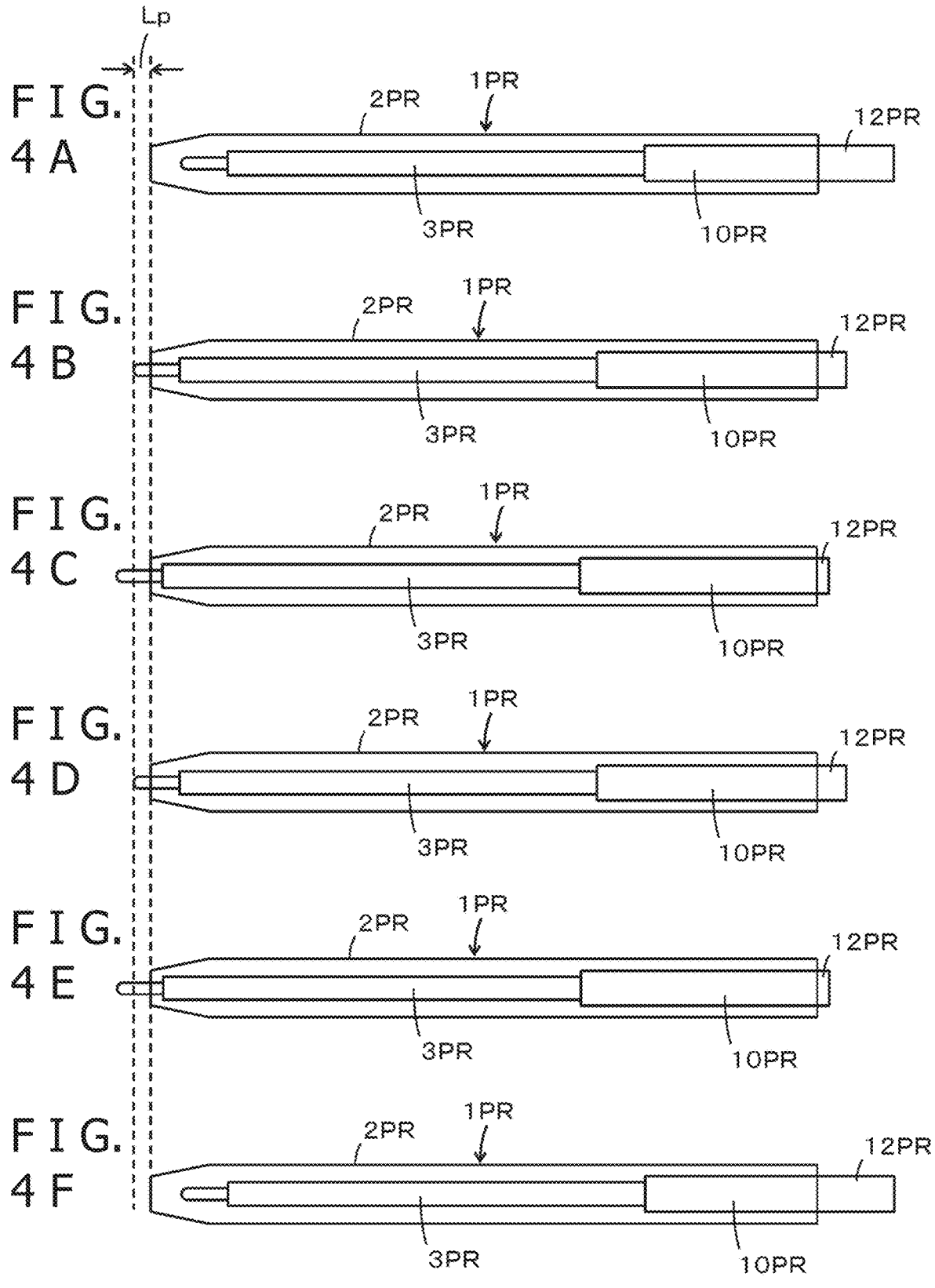
FIGS. 4A to 4F are diagrams for explaining movement of a pen tip side during a knock operation in a conventional knock-type electronic pen, as an example for comparison with the electronic pen according to the embodiment of the present disclosure.

An electronic pen and an electronic pen main body according to embodiments of the present disclosure will hereinafter be described with reference to the drawings.

FIGS. 1A to 1C depict a configuration example of an electronic pen according to an embodiment of the present disclosure, and this example illustrates an electronic pen of an electromagnetic induction type. An electronic pen 1 according to the present embodiment has a cartridge-type configuration, and main functions of the electronic pen, such as a position indication function for a position detection sensor and a pen pressure detection function, are housed in an electronic pen main body 3 which forms an electronic pen cartridge. The electronic pen 1 has a knock-type configuration in which a pen tip side of the electronic pen main body 3 is pushed out of and retracted into a pen housing 2 from the side of an opening 2b defined at one end in a longitudinal direction of the pen housing 2. In the present embodiment, the electronic pen main body 3 can be attached to and detached from the pen housing 2.

FIG. 1A illustrates a state in which the entire electronic pen main body 3 is housed in a hollow portion 2a of the pen housing 2, and FIG. 1B illustrates a state in which a knock cam mechanism 10 described later has pushed out the pen tip side of the electronic pen main body 3 from the opening 2b of the pen housing 2. Note that, in FIGS. 1A and 1B, the pen housing 2 of the electronic pen 1 is made of transparent synthetic resin, and the inside of the pen housing 2 can be seen in a see-through manner. FIG. 1C depicts a configuration example of the electronic pen main body 3 according to the present embodiment.

The pen housing 2 of the electronic pen 1 according to the present embodiment has a tubular shape, a cylindrical shape in this example, as illustrated in FIGS. 1A and 1B. The pen housing 2 has the hollow portion 2a inside, and one end side in an axial direction of the pen housing 2 is a gradually tapered pen tip side. The opening 2b is provided on the tip end of the pen housing 2. In the electronic pen 1 according to the present embodiment, the electronic pen main body 3 is housed in the hollow portion 2a of the cylindrical pen housing 2 as illustrated in FIGS. 1A and 1B, and the knock cam mechanism 10 provided on the other end side (hereinafter referred to as the back end side) in the axial direction of the pen housing 2 pushes and pulls the pen tip side of the electronic pen main body 3 out of and into the pen housing 2 via the opening 2b at the one end in the longitudinal direction of the pen housing 2.

The pen housing 2 in this example includes a pen tip side housing portion 21 on one end side in the axial direction and a back end side housing portion 22 on the other end side in the axial direction that are coupled with each other at a coupling portion 23 as illustrated in FIGS. 1A and 1B. The coupling portion 23 in this example is configured such that the pen tip side housing portion 21 is screwed into the back end side housing portion 22.

Note that the coupling of the pen tip side housing portion 21 and the back end side housing portion 22 is not limited to the coupling by screwing as in this example. A ring-shaped protrusion may be formed on one of the pen tip side housing portion 21 and the back end side housing portion 22, and a ring-shaped recess may be formed on the other. One of the pen tip side housing portion 21 and the back end side housing portion 22 may be pressed and fitted to the other to fit the ring-shaped recess to the ring-shaped protrusion, thereby coupling the pen tip side housing portion 21 and the back end side housing portion 22.

The knock cam mechanism 10 in this example is provided in the back end side housing portion 22 of the pen housing 2 as illustrated in FIGS. 1A and 1B. The configuration of the knock cam mechanism 10 may be the same as the configuration of a knock cam function portion of a well-known commercially available knock-type ballpoint pen. That is, the knock cam mechanism 10 has a well-known configuration with a combination of a cam main body 11, a knock rod 12, and a rotor 13 as illustrated in FIGS. 1A and 1B. The cam main body 11 is formed on an inner wall surface of the back end side housing portion 22. The knock rod 12 has an end portion 12a protruding from a back end side opening 2c of the pen housing 2 that is an opening defined on a side opposite from the pen tip side of the back end side housing portion 22, so that the knock rod 12 can receive a knock operation performed by a user.

Note that, in FIGS. 1A and 1B, a coil spring 5 is a return spring (hereinafter the "return spring 5") for returning, through a knock operation, the pen tip side of the electronic pen main body 3 from a pushed-out state in which the pen tip side protrudes as illustrated in FIG. 1B to a retracted state illustrated in FIG. 1A.

The rotor 13 includes an electronic pen main body holding portion 13a having a fitting recess 13J to which a fitting protrusion 3P (see dashed lines of FIGS. 1A and 1B and see FIG. 1C) provided on the back end side of the electronic pen main body 3 is fitted.

In the present embodiment, the fitting protrusion 3P of the back end portion of the electronic pen main body 3 is fitted to the fitting recess 13J of the electronic pen main body holding portion 13a of the rotor 13 of the knock cam mechanism 10 provided on the back end side housing portion 22 to lock the electronic pen main body 3 to the back end side housing portion 22. The electronic pen main body 3 is then inserted into the pen tip side housing portion 21 from the back end side of the pen tip side housing portion 21, and the pen tip side housing portion 21 is coupled to the back end side housing portion 22. The electronic pen 1 may be configured in this manner. Note that the electronic pen main body 3 can be attached to and detached from the electronic pen main body holding portion 13a of the rotor 13 of the knock cam mechanism 10.

The electronic pen main body 3 according to the present embodiment includes an axial member 30, a signal transmission member 40, a main body housing 50, and an elastic displacement portion 60 provided, in this example, between the main body housing 50 and the fitting protrusion 3P as illustrated in FIG. 1C. The main body housing 50 includes a holder portion 51 that holds a pen pressure detection portion 71 and that holds a circuit board 72 provided with an electronic circuit. The main body housing 50 further includes a protection cover portion 52 having a function of housing and protecting the pen pressure detection portion 71 and the circuit board 72 held by the holder portion 51.

The axial member 30 may be formed of a relatively hard elastic resin material such as polyoxymethylene (POM) in this example, and a tip end portion 30a with a diameter larger than that of a rod-like axis portion is formed on the pen tip side of the axis portion in this example.

The signal transmission member 40 includes a coil 41 constituting a resonant circuit for transmitting and receiving signals to and from a position detection apparatus with use of an electromagnetic induction system, and a magnetic core, which is a ferrite core 42 in this example, around which the coil 41 is wound. A through hole 42a is formed in the ferrite core 42 in the axial direction.

The diameter of the through hole 42a of the ferrite core 42 is larger than that of the axis portion of the axial member 30, and the axis portion of the axial member 30 is inserted into the through hole 42a and fitted to the pen pressure detection portion 71. In this case, the tip end portion 30a of the axial member 30, as a pen tip, protrudes more than the ferrite core 42, and an end portion 30b on the back end side of the axis portion of the axial member 30 is fitted to the pen pressure detection portion 71. Therefore, the pressure (pen pressure) applied to the tip end portion 30a of the axial member 30 is applied to the pen pressure detection portion 71. The axial member 30 can be attached to and detached from the pen pressure detection portion 71.

The pen pressure detection portion 71 includes, for example, a mechanism that changes a capacitance of a variable capacitor according to the applied pressure (pen pressure) (for example, see Japanese Patent Laid-Open No. 2011-186803). Note that the pen pressure detection portion 71 may include a variable capacitor including a semiconductor chip including a microelectromechanical systems (MEMS) element (for example, see Japanese Patent Laid-Open No. 2013-161307). Note that the configuration of the pen pressure detection portion 71 is not limited to these examples.

An electronic component, such as a capacitor included in the resonant circuit along with the coil 41, is mounted on the circuit board 72, and in this example, a conductor pattern for connecting the pen pressure detection portion 71 including the variable capacitor to the resonant circuit is formed on the circuit board 72.

The holder portion 51 of the main body housing 50 is made, for example, of a resin material, and the holder portion 51 is fitted to the ferrite core 42 of the signal transmission member 40. The holder portion 51 includes a cylindrical portion (not illustrated) that holds the pen pressure detection portion 71, and includes a circuit board mounting table portion (not illustrated) on which the circuit board 72 is placed and held.

The protection cover portion 52 of the main body housing 50 includes a pipe-shaped member made of a hard material, which is a pipe-shaped member made of metal in this example. The protection cover portion 52 constitutes a circuit portion protection member that protects electrical circuit constituent parts of the circuit board 72 and the pen pressure detection portion 71 held by the holder portion 51.

That is, the main body housing 50 is formed by coupling the holder portion 51 and the protection cover portion 52 with each other in the axial direction in such a manner that part of the cylindrical portion, which holds the pen pressure detection portion 71 of the holder portion 51, and the circuit board mounting table portion are housed in the hollow portion of the protection cover portion 52. In this case, the cylindrical portion of the holder portion 51 and the pipe-shaped member constituting the protection cover portion 52 have the same diameter R0 as illustrated in FIG. 1C.

As illustrated in FIG. 1C, the elastic displacement portion 60 in this example includes a rod-like member 61 made, for example, of resin, and the rod-like member 61 is thinner than an inner diameter of the protection cover portion 52 of the main body housing 50. A coil spring 62 that can freely be extended and contracted is loosely fit to the rod-like member 61. In this example, the elastic displacement portion 60 is provided on the back end side of the protection cover portion 52 of the main body housing 50.

In this case, one end portion 61a in the axial direction of the rod-like member 61 has a diameter slightly larger than that of a middle part 61m of the rod-like member 61 where the coil spring 62 is loosely fit. An opening 52a defined on the back end side of the protection cover portion 52 has an inner diameter slightly smaller than the diameter of the one end portion 61a in the axial direction of the rod-like member 61. The rod-like member 61 is attached to the protection cover portion 52 such that the middle part 61m and another end portion 61b in the axial direction are exposed outside the protection cover portion 52, while the one end portion 61a is positioned on the opening 52a side of the back end in the hollow portion of the protection cover portion 52.

Due to the relation between the one end portion 61a of the rod-like member 61 and the inner diameter of the opening 52a on the back end side of the protection cover portion 52, the rod-like member 61 is prevented from being separated from the opening 52a on the back end side of the protection cover portion 52 in the state in which the rod-like member 61 is attached to the back end side of the protection cover portion 52. However, since the diameter of the rod-like member 61 is smaller than the inner diameter of the protection cover portion 52, the one end portion 61a side of the rod-like member 61 can move toward the pen tip side in the hollow portion of the protection cover portion 52.

The other end portion 61b in the axial direction of the rod-like member 61 has a diameter larger than that of the middle part 61m of the rod-like member 61 where the coil spring 62 is loosely fit. In this example, the diameter of the other end portion 61b is selected to be equal to the diameter R0 of the main body housing 50. In this example, the fitting protrusion 3P on the back end side of the electronic pen main body 3 is formed on a center portion of a circular end surface of the other end portion 61b of the rod-like member 61.

The coil spring 62 has a diameter selected to be larger than the diameter of the middle part 61m of the rod-like member 61 but smaller than the diameter R0 of the protection cover portion 52 and the other end portion 61b of the rod-like member 61. Therefore, the coil spring 62 is held at the middle part 61m between the end portion on the back end side of the protection cover portion 52 of the main body housing 50 and the other end portion 61b of the rod-like member 61. In this held state, the coil spring 62 has an elastic return force that elastically biases the end portion on the back end side of the protection cover portion 52 of the main body housing 50 and the other end portion 61b of the rod-like member 61.

In the present embodiment, the elastic displacement portion 60 is attached to the back end side of the main body housing 50 in this way, to thereby form the electronic pen main body 3 as illustrated in FIG. 1C. When a load equal to or greater than a predetermined value that contracts the length of the electronic pen main body 3 in the axial direction against an elastic displacement force of the elastic displacement portion 60 is applied to the electronic pen main body 3, the coil spring 62 of the elastic displacement portion 60 elastically contracts, and the one end portion 61*a* side of the rod-like member 61 is displaced to move toward the pen tip side in the protection cover portion 52. When the load disappears, the coil spring 62 elastically returns to extend, and the length of the electronic pen main body 3 in the axial direction returns to the original state of FIG. 1C.

In this case, the elastic property of the coil spring 62 is insensitive to a load within the range of the pen pressure applied to the tip end portion 30*a* of the axial member 30 during the use of the electronic pen 1. That is, the elastic property of the coil spring 62 is insensitive to a load within the range of the pen pressure value detected by the pen pressure detection portion 71. The elastic property of the coil spring 62 is such that the coil spring 62 extends and contracts as described above when the user performs a knock operation to apply a load larger than the load within the range of the pen pressure applied to the tip end portion 30*a* of the axial member 30 during the use of the electronic pen 1 or when an impact load or the like larger than the load in the range of the pen pressure is applied to the electronic pen 1.

Note that the elastic displacement portion 60 can be removed from the protection cover portion 52 of the electronic pen main body 3.

Note that the elastic property of the return spring 5 in the knock cam mechanism 10 described above is similar to the elastic property used in a general knock-type ballpoint pen or the like, and the elastic force of the return spring 5 is smaller than that of the coil spring 62 of the elastic displacement portion 60.

In the electronic pen main body 3 according to the present embodiment, a projection portion 80 projecting in a direction crossing the axial direction, which is a direction orthogonal to the axial direction in this example, from an outer circumference side surface of the main body housing 50 is provided at a predetermined position between the one end side and the other end side in the axial direction of the main body housing 50 as illustrated in FIGS. 1A, 1B, and 1C. The projection portion 80 has an end surface which intersects the axial direction, for example the end surface which lies orthogonal to the axial direction, as an end surface on the pen tip side of its projected part. In the present embodiment, the projection portion 80 is provided on the holder portion 51 on the pen tip side of the main body housing 50. The projection portion 80 may be formed integrally with an outer casing of the holder portion 51 or may be formed separately from the holder portion 51.

In this case, the projection portion 80 may be formed to project in the direction orthogonal to the axial direction throughout the entire outer circumference portion of the holder portion 51. However, in the present embodiment, parts separated from each other by 180 degrees, each having a width corresponding to the diameter of the holder portion 51, may protrude in the direction orthogonal to the axial direction as illustrated in FIG. 2. A tip end portion in the axial direction of the projection portion 80 has an arc shape corresponding to the shape along the inner wall surface of the pen housing 2. The tip end portion is shaped in this way to reduce as much as possible the contact part between the tip end portion in the axial direction of the projection portion 80 and the inner wall surface of the pen housing 2, to thereby allow the electronic pen main body 3 to easily move in the axial direction in the pen housing 2 during a knock operation or when an impact load is applied.

The projection portion 80 is formed in such a manner as to project from portions separated from each other by 180 degrees on the outer circumference of the main body housing 50 in the present embodiment. Therefore, a line portion that connects the coil 41 and the capacitor on the circuit board 72 included in the resonant circuit can be routed through a part other than the projection portion 80, such that the line portion is not rubbed against the inner wall surface of the pen housing 2. This can also reduce inconvenience in the knock-type electronic pen 1.

In the present embodiment, a step portion 2*d* is provided on the inner wall surface of the pen housing 2, which is the inner wall surface of the pen tip side housing portion 21 in the present embodiment, as illustrated in FIGS. 1A and 1B. The step portion 2*d* is an example of a stopper portion that is to be engaged with the end surface, which orthogonally intersects the axial direction in this example, on the pen tip side of the projection portion 80 provided on the main body housing 50 of the electronic pen main body 3, for preventing the electronic pen main body 3 from moving toward the pen tip side of the pen housing 2.

In the electronic pen 1, the length in the axial direction (a defined protrusion length) that the pen tip side of the electronic pen main body 3 should protrude outside from the opening 2*b* of the pen housing 2 during writing on an input surface of the position detection sensor is set in advance, while taking into account the case of an input operation for the user and the like.

In the present embodiment, the projection portion 80 provided on the main body housing 50 of the electronic pen main body 3 and the step portion 2*d* formed on the inner wall surface of the pen housing 2 are formed to engage with each other when the protrusion length of the pen tip side of the electronic pen main body 3 from the opening 2*b* of the pen housing 2 becomes the defined protrusion length Lp.

The relation between the formation position of the projection portion 80 provided on the main body housing 50 of the electronic pen main body 3 and the formation position of the step portion 2*d* formed on the inner wall surface of the pen housing 2 in the present embodiment will further be explained with reference to FIGS. 3A and 3B.

FIG. 3A is a cross-sectional view of the pen tip side of the pen tip side housing portion 21 of the pen housing 2, and FIG. 3B depicts the pen tip side of the electronic pen main body 3.

In the electronic pen main body 3, the signal transmission member 40 including the ferrite core 42, around which the coil 41 is wound, is attached to the holder portion 51 on the pen tip side of the main body housing 50 having the outer diameter R0, and the axial member 30 is further inserted through the through hole 42*a* of the ferrite core 42 and fitted to the pen pressure detection portion 71 arranged on the holder portion 51 as illustrated in FIG. 3B.

In this example, an outer diameter R1 of the ferrite core 42 is smaller than the outer diameter R0 of the main body housing 50 as illustrated in FIG. 3B. The part where the coil 41 is wound around the ferrite core 42 has an outer diameter R2 equal to or smaller than the outer diameter R0 of the main body housing 50. That is, the electronic pen main body 3 is formed to have a relation of R1<R2≤R0.

As illustrated in FIG. 3A, the opening 2*b* on the pen tip side of the pen housing 2 (pen tip side housing portion 21) has a diameter R3 slightly larger than the outer diameter R1 of the ferrite core 42 of the electronic pen main body 3. As illustrated in FIG. 1B, not only the axial member 30 but also a part of the ferrite core 42 are exposed outside from the opening 2*b* during the use of the electronic pen 1 in this example.

As illustrated in FIG. 3B, the length in the axial direction from the tip end of the tip end portion 30*a* of the axial member 30 to the part of the ferrite core 42 on the pen tip side is set to be the defined protrusion length Lp. As illustrated in FIG. 3B, the length in the axial direction from the tip end of the tip end portion 30a of the axial member 30 to the end surface on the pen tip side of the projection portion 80 of the holder portion 51 of the electronic pen main body 3 is denoted by Lz.

As illustrated in FIG. 3A, an inner diameter R4 of the hollow portion of the pen tip portion communicating with the opening 2b of the pen tip side housing portion 21 of the pen housing 2 is slightly larger than the outer diameter R0 of the electronic pen main body 3, and this prevents the signal transmission member 40 from coming into contact with the inner wall surface of the pen tip side housing portion 21 in the hollow portion having the inner diameter R4. In this example, the part of the hollow portion of the pen tip side housing portion 21, which ranges from the part having the inner diameter R4 to the opening 2b having the diameter R3, is tapered and gradually becoming narrower as illustrated in FIG. 3A. Therefore, if the part of the coil 41 of the electronic pen main body 3 is positioned at the tapered part, the coil 41 may come into contact with the inner wall surface of the tapered part.

Hence, in this example, the length in the axial direction, from a position separated from the tip end of the axial member 30 of the electronic pen main body 3 by the defined protrusion length Lp toward the back end, to an end portion on the pen tip side of the winding part of the coil 41 is equal to a length L2, which is from a tip end of the opening 2b of the pen tip side housing portion 21 of the pen housing 2 to the pen tip side end portion having the inner diameter R4 through the tapered portion, as illustrated in FIGS. 3A and 3B.

As illustrated in FIGS. 3A and 3B, the inner diameter of the hollow portion of the pen tip side housing portion 21 of the pen housing 2 on the back end side, at a position separated by a length L1 (=Lz−Lp) from the tip end of the opening 2b of the pen tip side housing portion 21, is a diameter R5, which is larger than the inner diameter R4 and the outer diameter R0. As a result, the step portion 2d is formed at the position at the length L1 (=Lz−Lp) from the tip end of the opening 2b of the pen tip side housing portion 21 of the pen housing 2.

Therefore, the length of the part having the diameter R4 on the pen tip side is L3 (=L1−L2) in the pen housing 2 of the electronic pen 1 according to the present embodiment as illustrated in FIG. 3A. When the pen tip side of the electronic pen main body 3 protrudes by the defined protrusion length Lp, the coil 41 of the electronic pen main body 3 illustrated in FIG. 3B is positioned at the part of the hollow portion 2a having the diameter R4 and the length L3. Therefore, the coil 41 does not come into contact with the inner wall of the hollow portion 2a of the pen housing 2. Hence, an unnecessary load due to a contact is not applied to the coil 41, and the signal transmission member 40 can be coupled to the position detection sensor via a stable magnetic flux.

The diameter of the arc portion at the tip end in the protrusion direction of the projection portion 80 formed on the holder portion 51 of the main body housing 50 of the electronic pen main body 3 is a diameter R6, which is larger than the inner diameter R4 of the hollow portion which is located on the pen tip side relative to the step portion 2d of the pen tip side housing portion 21 of the pen housing 2, and which is substantially equal to or slightly smaller than the inner diameter R5 of the pen tip side housing portion 21 of the pen housing 2. That is, the electronic pen main body 3 is formed to have a relation of R4<R6≤R5.

In this way, as illustrated in FIG. 1B, the projection portion 80 of the electronic pen main body 3 is engaged with the step portion 2d on the inner wall surface of the pen tip side housing portion 21 of the pen housing 2 to thereby prevent the electronic pen main body 3 from moving toward the pen tip side in the hollow portion 2a of the pen housing 2. In this state, the axial member 30 and part of the ferrite core 42 on the pen tip side of the electronic pen main body 3 can protrude outside from the opening 2b of the pen housing 2 by the defined protrusion length Lp.

Therefore, the state of the electronic pen 1 normally protruding outside from the opening 2b by the defined protrusion length Lp is maintained on the pen tip side, and this can prevent the coil 41, which is an example of a component that should not come into contact with the inner wall surface of the pen housing 2 on the pen tip side of the electronic pen main body 3, from coming into contact with the inner wall surface of the pen housing 2.

Moreover, in the present embodiment, since the diameter of the arc portion at the tip end in the protrusion direction of the projection portion 80 provided on the electronic pen main body 3 is the diameter R6 substantially equal to or slightly smaller than the inner diameter R5 of the pen tip side housing portion 21 of the pen housing 2, the displacement of the electronic pen main body 3 in the direction orthogonal to the axial direction is also suppressed. Therefore, this can also prevent the coil 41 as an example of the component that should not come into contact with the inner wall surface of the pen housing 2 on the pen tip side of the electronic pen main body 3 from coming into contact with the inner wall surface of the pen housing 2.

In the electronic pen 1 according to the present embodiment, the projection portion 80 of the electronic pen main body 3 is engaged with the step portion 2d on the inner wall surface of the pen tip side housing portion 21 of the pen housing 2. Therefore, the pen tip side of the electronic pen main body 3 does not protrude outside from the opening 2b of the pen housing 2 by a length greater than the defined protrusion length Lp, and the protrusion by a length greater than the defined protrusion length during a knock operation is also prevented. This can also prevent the coil 41 as an example of the component that should not come into contact with the inner wall surface of the pen housing 2 on the pen tip side of the electronic pen main body 3 from coming into contact with the inner wall surface of the pen housing 2.

The movement of the pen tip side of the electronic pen 1 according to the present embodiment during a knock operation will be described in comparison with the movement of a pen tip side of a conventional knock-type electronic pen 1PR.

FIGS. 4A to 4F are diagrams for explaining the movement of the pen tip side of an electronic pen main body 3PR during a knock operation of the conventional knock-type electronic pen 1PR. FIG. 4A illustrates an un-pushed state in which the pen tip side of the electronic pen main body 3PR is housed in a pen housing 2PR. FIG. 4B illustrates a state in which a user of the electronic pen 1PR presses a knock rod 12PR of a knock cam mechanism 10PR in the state of FIG. 4A to cause the pen tip side of the electronic pen main body 3PR to protrude from the opening of the pen housing 2PR by the defined protrusion length Lp.

In the conventional knock-type electronic pen 1PR, a push-out operation of the pen tip portion of the electronic pen main body 3PR is not completed in the state of FIG. 4B. When the pressing operation of the knock rod 12PR is stopped, the elastic displacement force of the return spring (not illustrated in FIGS. 4A to 4F) of the knock cam mechanism 10PR returns the electronic pen main body 3PR to the un-pushed state of FIG. 4A.

The user further pushes the knock rod 12PR in the state of FIG. 4B to cause the pen tip portion of the electronic pen main body 3PR to protrude from the opening of the pen housing 2PR by a length greater than the defined protrusion length Lp as illustrated in FIG. 4C. Consequently, the rotor of the knock cam mechanism 10PR rotates, and the knock cam mechanism 10PR is locked in the state in which the pen tip portion of the electronic pen main body 3PR protrudes from the opening of the pen housing 2PR by the defined protrusion length Lp as illustrated in FIG. 4D. The push-out operation is thus completed.

In the use state of the electronic pen 1PR of FIG. 4D in which the pen tip portion protrudes by the defined protrusion length Lp, the user further presses the knock rod 12PR to again cause the pen tip portion of the electronic pen main body 3PR to protrude from the opening of the pen housing 2PR by a length greater than the defined protrusion length Lp as illustrated in FIG. 4E. Consequently, the rotor of the knock cam mechanism 10PR rotates, and the locked state of the pushed-out electronic pen main body is released. The elastic displacement force of the return spring (not illustrated in FIGS. 4A to 4F) of the knock cam mechanism 10PR returns the electronic pen main body 3PR to the un-pushed state in which the pen tip side of the electronic pen main body 3PR is housed in the pen housing 2PR as illustrated in FIG. 4F, that is, returns the pen main body 3PR to the state illustrated in FIG. 4A.

In this way, in the case of the conventional knock-type electronic pen 1PR, the electronic pen main body 3PR needs to be moved toward the opening of the pen housing 2PR to cause the pen tip of the electronic pen main body 3PR to protrude over a protrusion length larger than the defined protrusion length Lp as illustrated in FIGS. 4C and 4E. In this case, the long time use of the electronic pen 1PR may cause the coil of the signal transmission member, which is an example of the component that should not come into contact with the inner wall surface of the pen housing 2PR on the pen tip side of the electronic pen main body 3PR, to come into contact with the inner wall surface of the pen housing 2PR.

Next, the movement of the pen tip side of the electronic pen main body 3 during a knock operation of the knock-type electronic pen 1 according to the present embodiment will be described with reference to FIGS. 5A to 5F. FIG. 5A illustrates an un-pushed state in which the pen tip side of the electronic pen main body 3 is housed in the pen housing 2. In this state, the step portion 2d of the pen housing 2 and the projection portion 80 of the electronic pen main body 3 are separated from each other and not engaged with each other.

In the state of FIG. 5A, the user of the electronic pen 1 presses the knock rod 12 of the knock cam mechanism 10 against the elastic force of the return spring 5 to cause the pen tip side of the electronic pen main body 3 to protrude from the opening of the pen housing 2 by the defined protrusion length Lp as illustrated in FIG. 5B. In this state, the step portion 2d of the pen housing 2 and the projection portion 80 of the electronic pen main body 3 are engaged with each other, and the pen tip side of the electronic pen main body 3 does not move further in the direction of protruding from the opening in the pen tip side housing portion 21.

However, the push-out operation of the pen tip portion of the electronic pen main body 3 is not completed in the state of FIG. 5B, and when the pressing operation of the knock rod 12 is stopped, the elastic displacement force of the return spring 5 (not illustrated in FIGS. 5A to 5F) of the knock cam mechanism 10 returns the electronic pen main body 3 to the un-pushed state of FIG. 5A.

In the state of FIG. 5B, when the user applies a pressure (load) against the elastic displacement force of the return spring 5, which is a pressure (load) smaller than the elastic displacement force of the coil spring 62 of the elastic displacement portion 60, to push the knock rod 12 to the pen tip side, the rotor 13 cannot be moved toward the pen tip side because the step portion 2d of the pen housing 2 and the projection portion 80 of the electronic pen main body 3 are engaged with each other.

In the state of FIG. 5B, when the user applies a large pressure (load) against the elastic displacement force of the coil spring 62 of the elastic displacement portion 60 to push in the knock rod 12, the protrusion length of the pen tip side of the electronic pen main body 3 remains to be the defined protrusion length Lp because the step portion 2d of the pen housing 2 and the projection portion 80 of the electronic pen main body 3 are engaged with each other. Meanwhile, the coil spring 62 of the elastic displacement portion 60 of the electronic pen main body 3 contracts, and the elastic displacement portion 60 contracts in the axial direction as illustrated in FIG. 5C. Accordingly, the rotor 13 of the knock cam mechanism 10 moves in the axial direction and rotates. The pen tip portion of the electronic pen main body 3 protrudes from the opening of the pen housing 2 by the defined protrusion length Lp. The knock cam mechanism 10 is locked in this state. As illustrated in FIG. 5D, the contracted coil spring 62 of the elastic displacement portion 60 of the electronic pen main body 3 returns to the original state, and the contracted elastic displacement portion 60 returns to the original length. The electronic pen 1 enters the use state in which the pen tip portion protrudes by the defined protrusion length Lp, and the pushing out of the pen tip portion in the knock operation is completed.

As is apparent from the description, the length in the axial direction of the movement of the pen tip side of the electronic pen main body 3 in the knock operation is smaller than the length of the stroke in the axial direction of the knock cam mechanism 10 in the knock operation for causing the pen tip side of the electronic pen main body 3 to protrude from the opening of the pen housing 2. That is, the pen tip side of the electronic pen main body 3 moves by the same amount as the amount of pushing in the knock rod 12 until the projection portion 80 abuts against the step portion 2d of the pen housing 2, and the pen tip side does not move more beyond that point. The application of a pressure (load) to the knock rod 12 against the coil spring 62 of the elastic displacement portion 60 of the electronic pen main body 3 changes the length of the elastic displacement portion 60 of the electronic pen main body 3 in the axial direction. The amount of change in the length of the elastic displacement portion 60 of the electronic pen main body 3 corresponds to a part of the stroke necessary in the knock operation.

When the user brings the tip end of the axial member 30 at the pen tip of the electronic pen 1 into contact with the input surface of the position detection sensor and applies a pen pressure in the use state of FIG. 5D, the pen pressure detection portion 71 accurately detects the pen pressure applied to the tip end of the axial member 30 because the elastic displacement portion 60 is insensitive to the pen pressure.

When an impact load is applied to the pen tip side due to, for example, an accidental drop of the electronic pen 1 in the state in which the pen tip of the electronic pen main body 3 is pushed out from the opening of the pen housing 2, the impact load is absorbed by the elastic displacement of the elastic displacement portion 60, and this can prevent the electronic pen 1 from being damaged. That is, the elastic displacement portion 60 plays a role of what is generally called a shock absorber. This similarly applies to a case in which an impact load is applied to the knock rod 12 side of the knock cam mechanism 10.

When the user further pushes in the knock rod 12 in the use state of FIG. 5D in which the pen tip portion protrudes by the defined protrusion length Lp, the protrusion length of the pen tip side of the electronic pen main body 3 remains to be the defined protrusion length Lp because the step portion 2d of the pen housing 2 and the projection portion 80 of the electronic pen main body 3 are engaged with each other. Meanwhile, the elastic displacement portion 60 of the electronic pen main body 3 contracts in the axial direction as illustrated in FIG. 5E. Accordingly, the rotor 13 of the knock cam mechanism 10 rotates, and the locked state of the pushed-out electronic pen main body is released. The elastic displacement force of the return spring 5 (not illustrated in FIGS. 5A to 5F) of the knock cam mechanism 10 returns the electronic pen main body 3 to the un-pushed state in which the pen tip side of the electronic pen main body 3 is housed in the pen housing 2 as illustrated in FIG. 5F, that is, returns to the state illustrated in FIG. 5A.

As described above, in the electronic pen 1 according to the present embodiment, the step portion 2d of the pen housing 2 and the projection portion 80 of the electronic pen main body 3 are engaged with each other in a knock operation of the electronic pen 1. The state of the pen tip side of the electronic pen main body 3 not protruding by an amount more than the defined protrusion length Lp is maintained, and the elastic displacement of the elastic displacement portion 60 allows the knock cam mechanism 10 to perform the push-out and return actions of the pen tip portion of the electronic pen main body 3.

This can prevent the coil 41, which is an example of a component that should not come into contact with the inner wall surface of the pen housing 2 on the pen tip side of the electronic pen main body 3, from coming into contact with the inner wall surface of the pen housing 2 during a knock operation. The displacement of the electronic pen main body 3, which has been pushed out by the knock operation, in the direction orthogonal to the axial direction is also suppressed due to the existence of the projection portion 80 as described above. This can also prevent the coil 41, which is an example of the component that should not come into contact with the inner wall surface of the pen housing 2 on the pen tip side of the electronic pen main body 3, from coming into contact with the inner wall surface of the pen housing 2.

Another Embodiment

Figure 6:
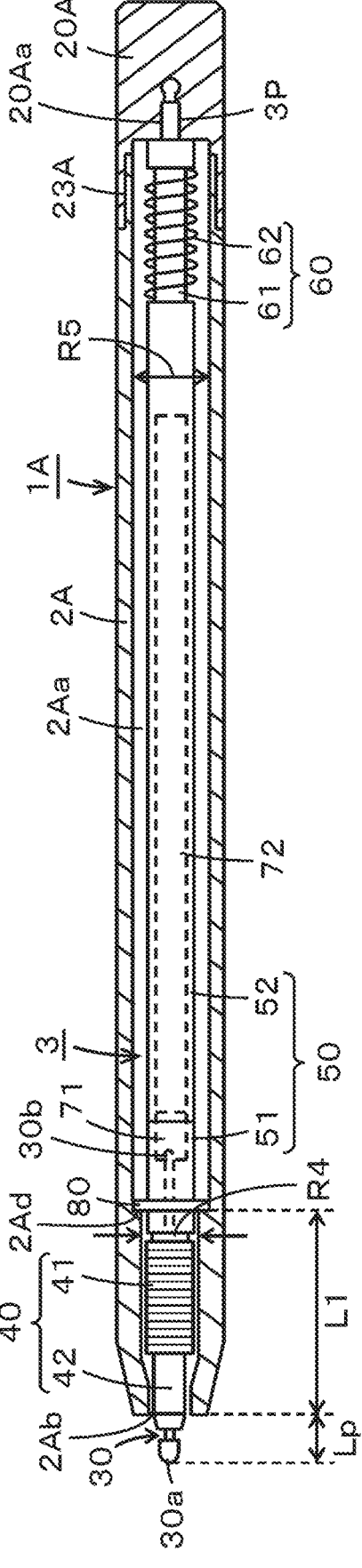
FIG. 6 is a cross-sectional view for explaining an electronic pen according to another embodiment of the present disclosure.

While the electronic pen according to the embodiment described above has a knock-type configuration, the electronic pen of the present disclosure is not limited to the knock-type configuration. FIG. 6 depicts a configuration example of an electronic pen 1A with a non-knock-type configuration according to another embodiment of the present disclosure.

The electronic pen main body 3 according to the embodiment described above may be used as is in the electronic pen 1A according to the present embodiment as illustrated in FIG. 6. The electronic pen main body 3 is housed in a hollow portion 2Aa of a cylindrical pen housing 2A made, for example, of resin, and the back end side of the pen housing

2A is closed by a lid portion 20A made, for example, of resin. Hence, the electronic pen main body 3 cannot move in the axial direction.

In this case, the pen housing 2A of the electronic pen 1A according to the present embodiment includes, on one end side in the axial direction, an opening 2Ab for causing the tip end portion 30a of the axial member 30 on the pen tip side of the electronic pen main body 3 and a part of the pen tip side of the ferrite core 42 around which the coil 41 is wound to protrude outside, as with the pen tip side housing portion 21 of the pen housing 2 of the electronic pen 1. As illustrated in FIG. 6, the inner diameter of the inner wall surface of the pen housing 2A on the pen tip side is selected to be R4, and the inner diameter thereof on the back end side is selected to be R5 such that a step portion 2Ad is formed at a position at the length L1 from a tip end portion of the opening 2Ab on the pen tip side in the axial direction of the pen housing 2A.

Therefore, when the electronic pen main body 3 is inserted into the hollow portion 2Aa from the opening on the back end side of the pen housing 2A, the projection portion 80 abuts against the step portion 2Ad of the pen housing 2A in the state in which the pen tip side of the electronic pen main body 3 protrudes by the defined protrusion length Lp as illustrated in FIG. 6, and the electronic pen main body 3 does not move more than that toward the pen tip side in the axial direction.

In this state, the lid portion 20A is coupled to the back end side of the pen housing 2A to close the back end side opening, so that the electronic pen main body 3 is housed in the hollow portion 2Aa of the pen housing 2A in the state in which the electronic pen main body 3 does not move in the axial direction in the hollow portion 2Aa of the pen housing 2A. In this case, the lid portion 20A has a fitting recess 20Aa to be fitted to the fitting protrusion 3P provided at the back end portion of the electronic pen main body 3.

In the electronic pen 1A according to the present embodiment, the elastic displacement portion 60 of the electronic pen main body 3 is contracted a little, and the length of the electronic pen main body 3 in the axial direction is elastically changed. In this state, the lid portion 20A is coupled to the pen housing 2A. Therefore, the lid portion 20A is coupled to the pen housing 2A in the state in which the projection portion 80 of the electronic pen main body 3 normally elastically biases the step portion 2Ad on the inner wall surface of the pen housing 2A toward the pen tip side.

Although not illustrated, the pen housing 2A and the lid portion 20A are screwed to each other at a coupling portion 23A. Note that the pen housing 2A and the lid portion 20A do not have to be coupled by screwing at the coupling portion 23A. A ring-shaped protrusion may be formed on one of the pen housing 2A and the lid portion 20A, and a ring-shaped recess may be formed on the other. One of the pen housing 2A and the lid portion 20A may be pressed and fitted to the other, so that the ring-shaped recess is fitted to the ring-shaped protrusion to couple the pen housing 2A and the lid portion 20A.

Also in the electronic pen 1A according to the present embodiment, the projection portion 80 is engaged with the step portion 2Ad of the pen housing 2A, and the electronic pen main body 3 maintains the state in which the pen tip side of the electronic pen main body 3 normally protrudes by the defined protrusion length Lp. Accordingly, also in the electronic pen 1A according to the present embodiment, it is possible to prevent the coil 41, which is an example of the component that should not come into contact with the inner wall surface of the pen housing 2A on the pen tip side of the electronic pen main body 3, from coming into contact with the inner wall surface of the pen housing 2A.

Moreover, in the electronic pen 1A according to the present embodiment, the diameter of the arc portion at the tip end in the protrusion direction of the projection portion 80 provided on the electronic pen main body 3 is the diameter R6 substantially equal to or slightly smaller than the inner diameter R5 of the pen housing 2A, and hence, the displacement of the electronic pen main body 3 in the direction orthogonal to the axial direction is also suppressed. This can also prevent the coil 41 as an example of the component that should not come into contact with the inner wall surface of the pen housing 2A on the pen tip side of the electronic pen main body 3 from coming into contact with the inner wall surface of the pen housing 2A.

Further, also in the use state of the electronic pen 1A according to the present embodiment, as with the electronic pen 1 of the embodiment described above, when a user brings the tip end of the axial member 30 of the pen tip into contact with the input surface of the position detection sensor to apply a pen pressure to the tip end, the pen pressure detection portion 71 accurately detects the pen pressure applied to the tip end of the axial member 30 because the elastic displacement portion 60 is insensitive to the pen pressure.

When an impact load is applied to the pen tip side due to, for example, an accidental drop of the electronic pen 1A, the impact load is absorbed by the elastic displacement of the elastic displacement portion 60, and this can prevent the electronic pen 1A from being damaged.

Note that, while the electronic pen main body 3 including the elastic displacement portion 60 is used as is in the electronic pen 1A according to the present embodiment illustrated in FIG. 6, the electronic pen main body 3 does not have to include the elastic displacement portion 60. In this case, the lid portion 20A can include, for example, an elastic member, such as an elastic resin member containing, for example, hard rubber. In this way, the lid portion 20A can be coupled to the pen housing 2A to normally elastically bias the electronic pen main body 3 toward the pen tip side in the hollow portion 2Aa of the pen housing 2A in the state in which the projection portion 80 of the electronic pen main body 3 is engaged with the step portion 2Ad on the inner wall surface of the pen housing 2A.

Other Embodiments or Modifications

While, in the embodiments described above, the stopper portion on the inner wall surface of the pen housing 2 to be engaged with the projection portion 80 to prevent the movement of the electronic pen main body 3 toward the pen tip side is provided as the step portion 2d formed by changing the diameter of the hollow portion of the pen housing 2, the stopper portion is not limited to the step portion 2d. The stopper portion may be any stopper portion that can be engaged with the projection portion 80 to prevent the movement of the electronic pen main body 3 toward the pen tip side. For example, the stopper portion may be a protrusion on the inner wall surface of the pen housing 2 to be engaged with all or part of the projection portion 80 to prevent the movement of the electronic pen main body 3 toward the pen tip side.

While, in the embodiments described above, the projection portion 80 provided on the electronic pen main body 3 projects in the direction orthogonal to the axial direction of the main body housing 50, the direction is not limited to the orthogonal direction. The projection portion 80 may be any projection portion that projects in a direction crossing the axial direction and that is to be engaged with a stopper portion including the step portion 2d or 2Ad or the like. In this regard, the formation position of the stopper portion including the step portion 2d or 2Ad or the like and the formation position of the projection portion 80 are selected and determined based on the engagement position of the stopper portion including the step portion 2d or 2Ad or the like and the projection portion 80.

While, in the embodiments described above, the elastic displacement portion 60 is provided on the back end side of the main body housing 50 of the electronic pen main body 3, the elastic displacement portion 60 may be provided in the middle of the main body housing 50. For example, the protection cover portion 52 of the main body housing 50 may be divided into two pieces, and the elastic displacement portion 60 may be provided between the two divided pieces of the protection cover portion 52.

While, in the embodiments described above, the projection portion 80 is formed to project from portions separated from each other by 180 degrees on the outer circumference of the main body housing 50, formation of the projection portion 80 is not limited to this configuration. The projection portion 80 may be formed to project in three directions from three portions separated from each other by 120 degrees, or may be formed throughout the entire circumference of the main body housing 50. For example, a unitary projection portion may be formed along a predetermined angle range on the outer circumference of the main body housing 50 of the electronic pen main body 3.

FIGS. 7A and 7B illustrate an example of forming a projection portion along the entire circumference of the main body housing 50 of the electronic pen main body 3 according to another embodiment, and in this example, the holder portion 51 of the main body housing 50 is particularly shaped to form the projection portion.

FIG. 7A is an enlarged view of a holder portion 51A of a main body housing 50A of an electronic pen main body 3A in this example on a side coupled to the signal transmission member 40 including the coil 41 wound around the ferrite core 42. FIG. 7B is an enlarged perspective view of the part of the signal transmission member 40 including the coil 41 wound around the ferrite core 42 and the holder portion 51A of the main body housing 50A.

In the example of FIGS. 7A and 7B, the holder portion 51A of the main body housing 50A has an outer diameter equal to the outer diameter R0 of the protection cover portion 52, at a position where the holder portion 51A is coupled to the pen tip side end portion of the protection cover portion 52. The holder portion 51A has an outer diameter gradually increasing toward the pen tip side from the outer diameter R0 at the position where the holder portion 51A is coupled to the protection cover portion 52, and includes a projected-shape portion 80A the maximum outer diameter of which is the diameter R6 substantially equal to or slightly smaller than the inner diameter R5 of the hollow portion of the pen housing 2. The projected-shape portion 80A constitutes the projection portion. In the example of FIGS. 7A and 7B, a tip end part 51Aa having an outer diameter equal to the outer diameter R0 of the protection cover portion 52 is formed on the pen tip side of the projected-shape portion 80A.

Therefore, in this example, a step portion is formed at the boundary between an end portion on the pen tip side of the projected-shape portion 80A and the tip end part 51Aa as illustrated in FIGS. 7A and 7B, and an end surface 80Aa of the projected-shape portion 80A constituting the step portion is to be engaged with the step portion 2*d* of the pen housing 2. Note that the tip end part 51A*a* does not have to be provided, and the holder portion 51A may be formed to include only the projected-shape portion 80A. The end surface 80A*a* of the projected-shape portion 80A may be formed to be engaged with the step portion 2*d* as an example of the stopper portion on the inner wall surface of the pen housing 2.

In the present embodiment, a recess 80A*b* is provided on the projected-shape portion 80A of the holder portion 51A, at a predetermined angular position in the circumferential direction as illustrated in FIGS. 7A and 7B. Meanwhile, in the case of this example, a protrusion to be engaged with the recess 80A*b* is formed on the inner wall surface near the step portion 2*d* of the pen housing 2, at a predetermined angular position in the circumferential direction. The protrusion of the pen housing 2 is engaged with the recess 80A*b* to prevent the electronic pen main body 3A from rotating about the axial direction. That is, the recess 80A*b* is provided to prevent the rotation of the electronic pen main body 3A.

In this example, a recessed groove 80A*c* along the axial direction is formed on the outer circumference surface of the projected-shape portion 80A of the holder portion 51A, at a predetermined angular position in the circumferential direction as illustrated in FIG. 7B. In this example, lead portions 41*a* and 41*b* on both ends of the coil 41 are placed in the recessed groove 80A*c* and led into the protection cover portion 52 as illustrated in FIG. 7B. The circuit board held by the holder portion 51A exists in the protection cover portion 52, and the lead portions 41*a* and 41*b* of the coil 41 are connected to the capacitor arranged on the circuit board to form the resonant circuit.

While the case of the electronic pen of the electromagnetic induction type has been described in the embodiments described above, the electronic pen is not limited to the electromagnetic induction type. For example, the present disclosure can also be applied to an electronic pen of a capacitance type such as an active capacitance type electronic pen in a similar manner.

It is to be noted that the embodiments of the present disclosure are not limited to the foregoing embodiments, and that various changes can be made without departing from the scope of the present disclosure.

The invention claimed is:

1. An electronic pen, comprising:
a pen housing having an opening on a pen tip side and having a hollow portion inside;
an electronic pen main body having a main body housing to be housed in the hollow portion of the pen housing, with an axial member installed on a first end side in an axial direction of the main body housing, and a second end side in the axial direction of the main body housing being locked in the pen housing; and
a knock cam mechanism provided on the second end side in the axial direction of the pen housing, the knock cam mechanism being configured to hold the second end side in the axial direction of the main body housing and configured to push and retract the axial member installed on the main body housing of the electronic pen main body out of and into the pen housing from the opening defined on the pen tip side of the pen housing, based on a knock operation performed by a user, wherein
a projection portion projecting in a direction crossing the axial direction of the main body housing is formed on an outer circumference portion of the main body housing of the electronic pen main body, at a predetermined position in the axial direction,
a stopper portion to be engaged with the projection portion of the main body housing in a state in which a tip end side of the axial member is exposed outside from the opening of the pen housing, to prevent the electronic pen main body from moving toward the pen tip side in the pen housing, is formed on an inner wall surface of the hollow portion of the pen housing,
the electronic pen main body includes an elastic displacement portion that elastically contracts to change a length in the axial direction of the electronic pen main body according to a load applied in the axial direction of the main body housing, and
when the knock operation is performed, the elastic displacement portion elastically changes the length in a state in which the projection portion of the main body housing of the electronic pen main body and the stopper portion on the inner wall surface of the pen housing are engaged with each other.

2. The electronic pen according to claim 1, wherein
when the knock operation is performed, after the projection and the stopper portion are engaged with each other to prevent the electronic pen main body from moving toward the pen tip side, a proximal end of the knock cam mechanism is depressible toward the tip end side due to the contraction of the elastic displacement portion.

3. The electronic pen according to claim 1, wherein
the elastic displacement portion comprises a coil spring.

4. The electronic pen according to claim 3, wherein
the elastic displacement portion comprises a rod-like member to which the coil spring is fitted.

5. The electronic pen according to claim 1, wherein
the projection portion is arranged on the outer circumference portion of the main body housing such that a length in the axial direction of the main body housing from a tip end position of the axial member installed on the main body housing to a part of the projection portion to be engaged with the stopper portion is a sum of a length in the axial direction from a tip end position on the pen tip side of the pen housing to the stopper portion and a defined protrusion length in the axial direction of the main body housing that is a length of the pen tip side of the electronic pen main body with the axial member installed thereon set to be exposed outside from the opening on the pen tip side of the pen housing during use of the electronic pen.

6. The electronic pen according to claim 1, wherein
the electronic pen main body is elastically biased toward the pen tip side in the pen housing in the state in which the tip end side of the axial member is exposed outside from the opening of the pen housing.

7. The electronic pen according to claim 1, wherein
the electronic pen main body includes, in the main body housing, a pen pressure detection portion that detects a pen pressure applied to the axial member, and
the elastic displacement portion is insensitive to a load within a range of values of the pen pressure detected by the pen pressure detection portion and is configured to elastically change the length in such a manner as to absorb a load larger than the load within the range of values of the pen pressure.

8. The electronic pen according to claim 1, wherein
the elastic displacement portion is provided to the main
body housing on a side opposite from the side having
the axial member installed thereon in the axial direction
of the main body housing.

9. The electronic pen according to claim 1, wherein
the elastic displacement portion elastically biases the
electronic pen main body toward the pen tip side in the
pen housing in the state in which the projection portion
of the main body housing and the stopper portion are
engaged with each other.

10. The electronic pen according to claim 1, wherein
a protrusion end surface of the projection portion in the
direction crossing the axial direction of the main body
housing abuts against the inner wall surface of the
hollow portion of the pen housing, so that a center line
of the main body housing remains at a same position as
a center line of the hollow portion of the pen housing.

11. The electronic pen according to claim 1, wherein
a coil wound around a magnetic core is provided on the
pen tip side of the electronic pen main body, and a
formation position of the projection portion of the
electronic pen main body in the axial direction of the
main body housing and a formation position of the
stopper portion on the inner wall surface of the pen
housing in the axial direction of the pen housing are set
such that an end portion on the pen tip side of the coil
does not come into contact with the inner wall surface
of the pen housing in a state in which the axial member
protrudes from the opening on the pen tip side of the
pen housing.

12. The electronic pen according to claim 1, wherein
the stopper portion is configured as a step portion formed
on the inner wall surface of the pen housing.

13. An electronic pen main body comprising:
a main body housing to be housed in a hollow portion of
a pen housing having an opening on a pen tip side,
an axial member installed on a first end side in an axial
direction of the main body housing, wherein a second
end side in the axial direction of the main body housing
is configured to be locked in the pen housing,
a projection portion projecting in a direction crossing the
axial direction formed on an outer circumference por-
tion of the main body housing, at a predetermined
position in the axial direction, and
an elastic displacement portion that elastically contracts to
change a length in the axial direction of the electronic
pen main body according to a load applied in the axial
direction of the main body housing,
wherein
the projection portion of the main body housing is
engaged with a stopper portion provided on an inner
wall surface of the hollow portion of the pen housing in a state in which a tip end side of the axial member is
exposed outside from the opening of the pen housing,
to thereby prevent the electronic pen main body from
moving toward the pen tip side in the axial direction,
and
when a knock operation on the pen housing is performed
to push the axial member out of the pen housing from
the opening of the pen housing, the elastic displace-
ment portion elastically changes the length in a state in
which the projection portion of the main body housing
of the electronic pen main body and the stopper portion
on the inner wall surface of the pen housing are
engaged with each other.

14. The electronic pen main body according to claim 13,
wherein
the elastic displacement portion comprises a coil spring.

15. The electronic pen main body according to claim 14,
wherein
the elastic displacement portion comprises a rod-like
member to which the coil spring is fitted.

16. The electronic pen main body according to claim 13,
wherein the projection portion is arranged on the outer
circumference portion of the main body housing such
that a length in the axial direction of the main body
housing from a tip end position of the axial member
installed on the main body housing to a part of the
projection portion to be engaged with the stopper
portion is a sum of a length in the axial direction from
a tip end position on the pen tip side of the pen housing
to the stopper portion and a defined protrusion length in
the axial direction of the main body housing that is a
length of the pen tip side of the electronic pen main
body with the axial member installed thereon set to
protrude from the opening on the pen tip side of the pen
housing during use of the electronic pen.

17. The electronic pen main body according to claim 13,
further comprising:
a pen pressure detection portion arranged in the main
body housing and configured to detect a pen pressure
applied to the axial member, wherein
the elastic displacement portion is insensitive to a load
within a range of values of the pen pressure detected by
the pen pressure detection portion and is configured to
elastically change the length in such a manner as to
absorb a load larger than the load within the range of
values of the pen pressure.

18. The electronic pen main body according to claim 13,
wherein
the elastic displacement portion is provided to the main
body housing on a side opposite to the side having the
axial member installed thereon in the axial direction of
the main body housing.

\* \* \* \* \*